(12) United States Patent
deVries et al.

(10) Patent No.: US 8,028,271 B2
(45) Date of Patent: Sep. 27, 2011

(54) PATCH-AWARE EDITOR

(75) Inventors: Alex deVries, Ottawa (CA); David Reyna, San Francisco, CA (US)

(73) Assignee: Wind River Systems, Inc., Alameda, CA (US)

(*) Notice: Subject to any disclaimer, the term of this patent is extended or adjusted under 35 U.S.C. 154(b) by 1086 days.

(21) Appl. No.: 11/717,416

(22) Filed: Mar. 12, 2007

(65) Prior Publication Data

US 2008/0229282 A1 Sep. 18, 2008

(51) Int. Cl.
*G06F 9/44* (2006.01)
(52) U.S. Cl. .......................................................... 717/110
(58) Field of Classification Search .................... 717/110
See application file for complete search history.

(56) References Cited

U.S. PATENT DOCUMENTS

| | | | | |
|---|---|---|---|---|
| 6,477,703 B1* | 11/2002 | Smith et al. | ................... | 717/168 |
| 6,526,574 B1* | 2/2003 | Jones | ........................... | 717/168 |
| 6,567,830 B1* | 5/2003 | Madduri | ....................... | 715/235 |
| 2004/0177343 A1* | 9/2004 | McVoy et al. | ................. | 717/122 |
| 2004/0189713 A1* | 9/2004 | Thames et al. | ................ | 345/810 |
| 2005/0283622 A1* | 12/2005 | Hall et al. | ..................... | 713/190 |
| 2007/0113225 A1* | 5/2007 | Felts | ........................... | 717/172 |
| 2010/0138822 A1* | 6/2010 | Miyazaki | ..................... | 717/168 |

* cited by examiner

*Primary Examiner* — Philip Wang
(74) *Attorney, Agent, or Firm* — Fay Kaplun & Marcin, LLP

(57) ABSTRACT

A system and method for receiving an origin file corresponding to source code, modifying the source code to create a modified source code, creating a modified file corresponding to the modified source code and comparing the modified file to the origin file. A system having an editor for editing source code to create a modified source code and a patch aware editor storing an origin file corresponding to the source code and creating a modified file corresponding to the modified source code, the patch aware editor comparing the origin file to the modified file and displaying conflicts between the files.

13 Claims, 3 Drawing Sheets

PATCH-AWARE EDITOR

BACKGROUND

Open source projects such as Linux typically involve integration of multiple pieces of source code called upstream sources that are generated by an open source project. These sources (sometimes referred to as a pristine source) are then modified by a set of patch files provided by a distributor. The patch files provide corrections to fix bugs, apply an individual feature, etc. If a developer then wants to make further changes, the changes are made to the patched code. Once changes are made, the patched file is saved and the origin of the individual patches is lost. Sometimes a new patch file does not apply cleanly to a given pristine source or current collection of patch files, e.g., due to creating the patch file against a slightly different source tree. The process of resolving these problems can often require tedious work in rearranging the patch order, manually fixing the patch paragraph (also known as hunk) offsets, etc. In addition, this process is prone to error and may lead to loss of information if the original offsets become relevant later.

SUMMARY OF THE INVENTION

A method for receiving an origin file corresponding to source code, modifying the source code to create a modified source code, creating a modified file corresponding to the modified source code and comparing the modified file to the origin file.

A system having an editor for editing source code to create a modified source code and a patch aware editor storing an origin file corresponding to the source code and creating a modified file corresponding to the modified source code, the patch aware editor comparing the origin file to the modified file and displaying conflicts between the files.

A computer readable storage medium including a set of instructions executable by a processor, the set of instructions operable to receive an origin file corresponding to source code, modify the source code to create a modified source code, create a modified file corresponding to the modified source code and compare the modified file to the origin file.

DETAILED DESCRIPTION

Figure 1:
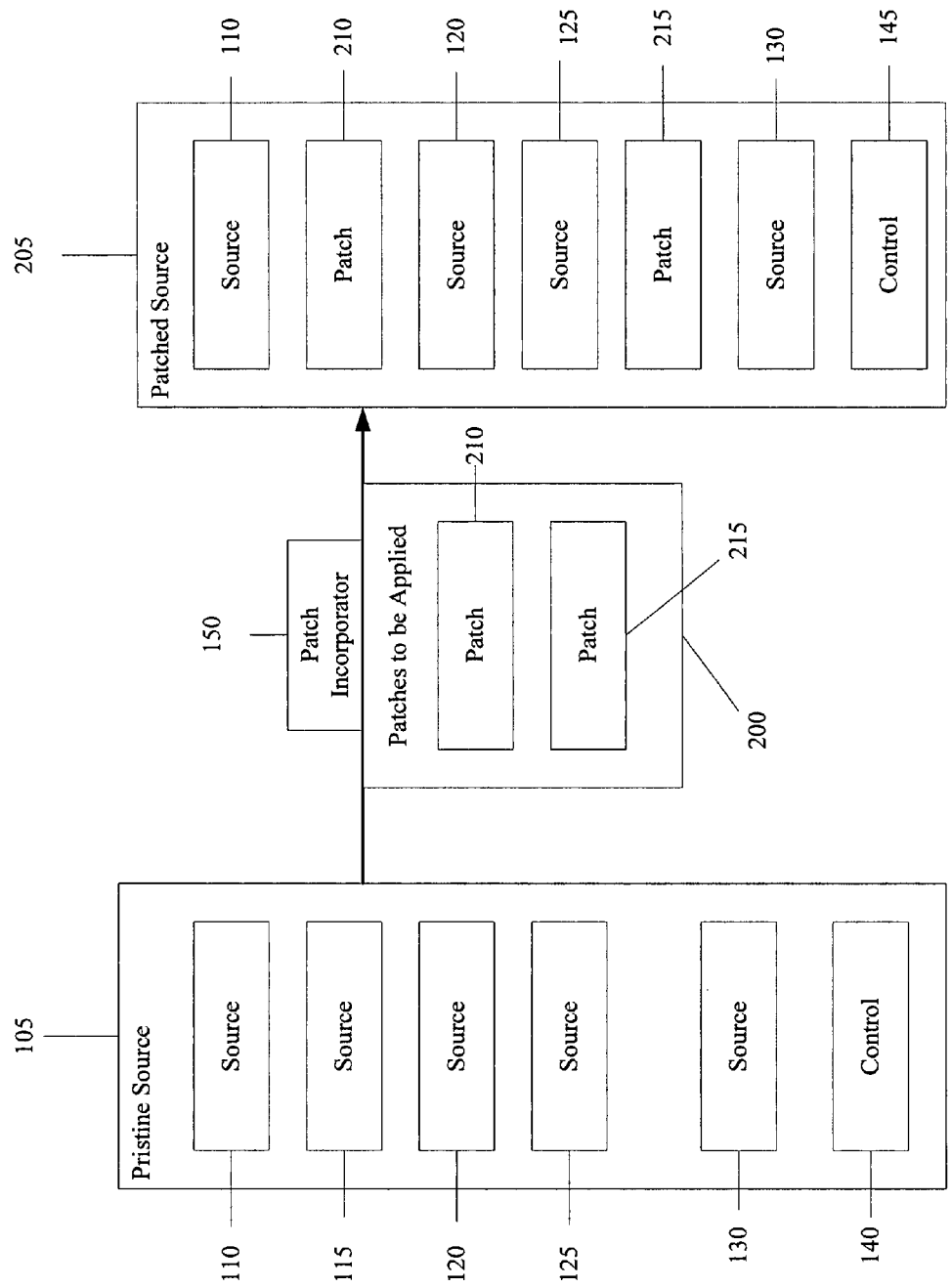
FIG. 1 shows an exemplary embodiment of a patched source through an incorporation of patches to a pristine source according to the present invention.

The present invention may be further understood with reference to the following description and the appended drawings, wherein like elements are referred to with the same reference numerals. The exemplary embodiments of the present invention describe a method to edit a source using a patch aware editor. The source and patch aware editor will be discussed in detail below. The exemplary embodiments of the present invention will be described with reference to an open source project. However, those skilled in the art will understand that the patch aware editor of the present invention may be used in any project where the user desires to maintain information about the original source code file and the modification (e.g., patches) to that original source code file.

Open source projects provide a set of source files. These files are most often usually as a Tape Archive Record (TAR), but they may be bundled in other manners. The set may be referred to as the pristine source. The distributor of the open source project may further make changes to fix bugs, provide facilities to do integration or implement new features, etc. This is accomplished using patch files. For example, in Wind River Linux distributed by Wind River Systems, Inc. of Alameda, Calif., changes against the pristine source are distributed in a format called Unified Diff. However, other distributors may make and distribute changes in other formats. The format of the distribution is irrelevant to the exemplary embodiments of the present invention. Sometimes, multiple patch files are required where each one applies to an individual feature. A control file may also be provided. The order of the patches may be defined using the control file. For example, in Wind River Linux, the control file is a file called patches.list. However, those skilled in the art will understand that the term "spec file" is also used to refer to the control file (e.g., in an SRPM package). The control file is often distributed along with the source files. The control file may subsequently be replaced with an updated version created by the distributor or modified by a user. Other programs such as Red Hat Package Manager use the same structure as described above. Those skilled in the art will understand that the distributor is not the only user who may provide patch files but individual users may also contribute modifications to the project community.

FIG. 1 shows an exemplary embodiment of a patched source 205 through an incorporation of patches to a pristine source 105 according to the present invention. As discussed above, the pristine source 105 is a set of source files 110-130. The source files 110-130 are represented as blocks that include a base operation, feature, etc. of the open source project. For example, source 110 may be a startup operation that initializes the open source project. Source 115 may be a feature of the open source project such as display, user interface, connection options, etc. It should be noted that the set of source files 110-130 represented as blocks is only exemplary. Those skilled in the art will understand that the set of source files may be inseparable. Those skilled in the art will also understand that each source file 110-130 of the pristine source 105 is many lines of code that, when compiled, creates the user operable open source project.

In this example, a set of patch files 210, 215 is shown in patch application 200. Patch files such as patch files 210, 215 provide corrections and/or additions to the pristine source 105. For example, the patch file 210 may fix a bug contained in the pristine source 105, specifically, in the source file 115. The patch file 210 may incorporate replacement lines of code to fix the bug or it may add lines of code to address a programming error, such as a pointer with no target. In another example, the patch file 215 may add a new feature to the pristine source 105. In the exemplary embodiment, the patch file 215 is incorporated together with the source files 125 and 130. However, those skilled in the art will understand that the addition of a feature may be incorporated within a source file such as the source file 125 (similar to the creation of patch file 210). It should be noted that the use of a patch file for a single source file is only exemplary and this use is to show a simplified version of patch file incorporation functions. For example, a single patch file may be incorporated into several different source files and may also add a new feature not in the set of source files of the pristine source 105. Those skilled in the art will understand that multiple patch files are sometimes required, each one applying an individual feature. In addition, multiple patch files may be required for a single feature. Those skilled in the art will also understand that patch files such as patch files 210, 215 may also provide file deletions from the pristine source 105. For example, the patch file 210 may change a feature or file naming convention contained in the pristine source by removing one or more files and replacing them with other files. For example, the patch files 210, 215 may cause the removal of source 105 and the addition of a replacement source file 115.

In the exemplary embodiment, a patch incorporator 150 applies the patch files 210, 215 of the patch application 200 to the pristine source 105. The patch incorporator 150 is shown as a separate function from the pristine source 105 and the patched source 205. However, those skilled in the art will understand that the patch incorporator 150 may be a functionality of the open source project itself. As part of the open source project, when a patch file (e.g., patch file 210, 215) is recognized, the open source project incorporates the patch to the pristine source 105 to be placed together with source files 110-130. Those skilled in the art will also understand that the patch file may contain the functionality to incorporate itself into a respective portion of the pristine source 105. Patch files containing self installation functionality may be necessary when the patch file is created by a user who is not the maintainer of the open source project. However, those skilled in the art will understand that often, contributors to the open source project submit potential patches to the distributor. In such cases, the distributor may adjust the patch to conform to a standard format for incorporation.

The patch incorporator 150 may be, for example, a diff generator. A diff generator creates a file comparison that outputs the difference between two files. The difference is the resulting patch that is incorporated. The two files that are compared are usually an original file and a new file. The difference file represents the changes to be made for the original file to become the new file. It should be noted that the patch incorporator 150 may display the original file, the new file, and/or the difference file to the user for editing purposes. The diff generator may generate patch files in a variety of formats, for example, the Unified Diff format for Wind River Linux. The patch incorporator 150 may also modify the control file (e.g., patches.list) that defines the order of the patches that are applied. In the exemplary embodiment of FIG. 1, the original control file 140 is shown in the pristine source 105, while the updated control file 145 is shown in the patched source 205. Those skilled in the art will understand that when patches distributed by the developer are applied, the control file is modified to redefine the order of patches. The control file may be used as a reference file to dictate an order of the patches that were applied to the pristine source. The open source project may use the control file to determine the method of incorporating the subsequent patch, depending on the patches and the order the patches were incorporated. It is noted that the above described multiple functionalities for the patch incorporator 150 including a patch control file modifier (e.g., changing control file 140 into control file 145) and a patch difference generator that may be used to change original source into a patch.

Figure 2:
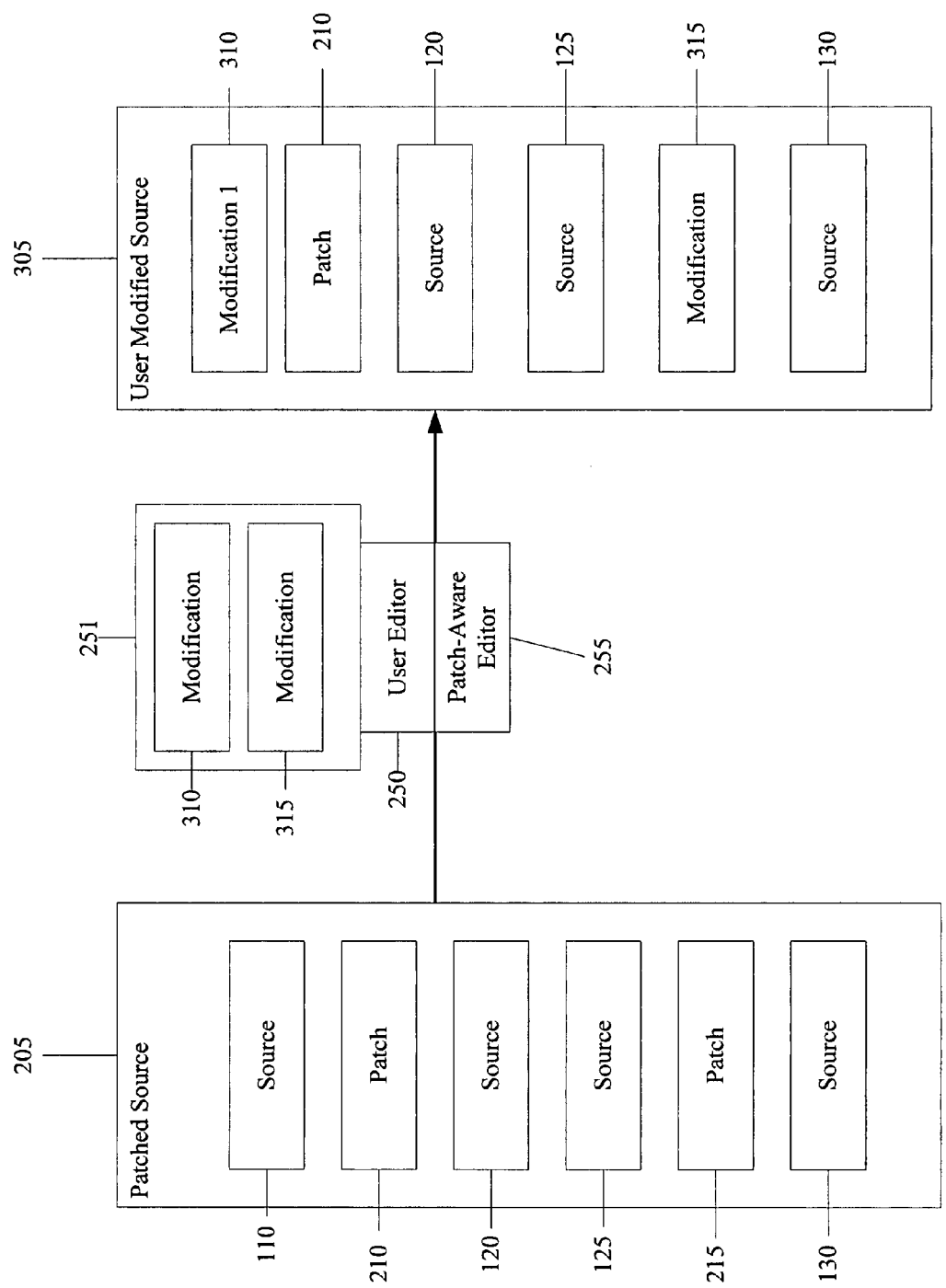
FIG. 2 shows an exemplary embodiment of a user modified source through an incorporation of modifications to the patched source of FIG. 1 according to the present invention.

FIG. 2 shows an exemplary embodiment of a user modified source 305 through an incorporation of modifications to the patched source 205 of FIG. 1 according to the present invention. As described above, downstream users of the open source project (such as Linux) will not obtain the source code directly from the open source project. Rather, these users will obtain the software from distributors such as Wind River, Red Hat, etc. There are several advantages to obtaining the open source project from a distributor. For example, distributors may fix bugs in the project, may provide documentation, may add features not available in the project, may ensure that all users in an organization are using the same version of the project, may provide the control file with a patch order, etc. Thus, the user will receive the patched source 205 from the distributor. Those skilled in the art will understand that the user may not receive the patched source 205 as one package, but may, for example, receive the pristine source 105 as one package and the patches (e.g., patches 210 and 215) either individually or collectively as separate packages (e.g., Source RPM format). The patches may then be applied (normally through auto installation functions provided with the patches) to the pristine source 105 to create the patched source 205.

The user modified source 305 is created when a user chooses to modify the patched source 205. Open source projects allow users to display the lines of source code of the program and then further modify the code. Modifications may be made to the source files 110, 120, 125, 130 in the patched source 205 that are in the same state as in the pristine source 105 and/or the patch files 210, 215 of the patched source 205 added/modified by the distributor. The user may then add, delete, or edit the files as desired.

In the exemplary embodiment, the user modified source 305 contains a modification to the source file 110 of the patched source 205. As discussed above, a user modified the source file 110 to create modification file 310. Those skilled in the art will understand that the modification file 310 is the same as a patch file, but the term "modification file" is used to distinguish a user modified file (modification file) from a distributor modified file (patch file). However, since both these types of files are the same (a file of modified source code), the use of the term patch or patch file may refer to either embodiment. The user also modified patch 215 of the patched source 205 to create modification file 315. The modifications may be made using a user editor 250 to create the modifications 310 and 315 and shown as user input 251. Using conventional editors to make local changes, the source that is loaded is the user modified source 305. This user modified source 305 is stored onto a local storage device (e.g., hard disk) and subsequently used (i.e., loaded). However, conventional editors lose all separation of the features (e.g., edits, additions) with original code making it difficult for a user to port the changes to an updated version of the pristine source and/or the distributor patched source. In addition, a new patch file received from the community may not apply cleanly to a given pristine source or the current collection of patch files. This may occur for various reasons, for example, the new patch file was created against a slightly different source tree. To apply the new patch file would require tedious work in rearranging the patch order or manually fixing the patch paragraph offsets. It should be noted that throughout this document the term "paragraph" is used to refer to the units of patch file segments. Those skilled in the art will understand that the alternative term "hunk" is also commonly used to refer to such segments.

According to the present invention, the user editor 250 functions in conjunction with a patch-aware editor 255. Creating the user modified source 305 using the patch-aware editor 255 addresses the issues discussed above. The patch-aware editor 255 addresses the issues faced when users apply modifications to the source files, both pristine (e.g., pristine source 105) and patched (e.g., patched source 205). The patch-aware editor 255 provides facilities to keep the patches separate while providing facilities for the user to make changes using the user editor 250. The facilities allow the user to control the patches such as application, location, order, and designation (e.g., read-only). Exemplary embodiments of the user editor 250 functioning in conjunction with the patch-aware editor 255 will be discussed below.

As discussed above, a patch file may be incorporated within specific source files or together with the source files. In an exemplary embodiment, a base datastructure, referred to as a paragraph, is a sequential list of lines of source. A paragraph's content is stored in a single origin file, as either a patched source file or a pristine source file. A list of the patched paragraphs applied to a source file makes up the patched source files. Using the patch-aware editor 255, the user may add new patch files and change the layering (e.g., modify patches.list), and in this manner incorporate the functionality of the patch incorporator 150 into this single facility. When issues arise where patches do not apply cleanly, the patch-aware editor 255 would assist a user in resolving these issues. In one exemplary embodiment, the patch-aware editor 255 graphically displays the conflicts to the user.

The patch-aware editor 255 also includes facilities to perform further functionality not present in the conventional user editor 250. For example, using the patch-aware editor 250, a user may also create new paragraphs, break apart existing paragraphs, make changes to a paragraph's content, and/or delete paragraphs. These additional functions will be discussed in more detail below. However, independent of any edits made by the user, the patch-aware editor 255 preserves the integrity of the origin files when saving or loading the modified source files. It should be noted that the patch-aware editor 255 may display only the resulting patched source 205 to the user or it may also display the patched source 205 with representations of derivations from origin files.

Figure 3:
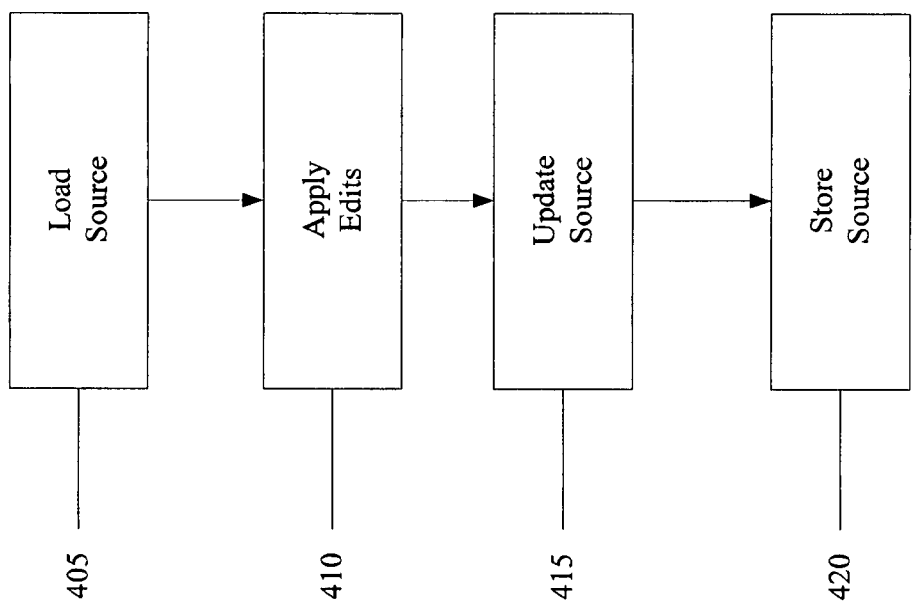
FIG. 3 shows an exemplary method for editing a source according to the present invention.

FIG. 3 shows an exemplary method for editing a source according to the present invention. It should be noted that the exemplary embodiments of FIGS. 1-2 will be used throughout the description of the exemplary method shown in FIG. 3. Initially, in step 405, a source is loaded into the user editor 250 and patch-aware editor 255. The source that is loaded may be the pristine source 105 (composed of the source files 110-130) or the patched source 205 (composed of source files 110, 120, 125, 130 and patched files 210, 215). As discussed above, an advantage with an open source project is the readily available source code that is used to create it. In addition, the source code may be edited at any point, from the original code to massive patch and/or modification incorporation. Those skilled in the art will understand that the present invention is not limited to open source projects but may be used with any source code exhibiting the characteristics described herein.

In step 410, the user applies any edits (e.g., modifications) to the source file using the user editor 250. As discussed above, using the patch-aware editor 255, the user may control the application, location, order, and designation of the patch files or may create new paragraphs, break apart existing paragraphs, make changes to paragraph content, and/or delete paragraphs. The patch-aware editor 255 provides graphic representations of sections where the edits do not apply cleanly to the source file. The patch-aware editor 255 may provide a user interface with tools (e.g., search and replace, syntax highlighting, etc.) found in conventional user editors 250 but may also provide additional functionality. Such functions may include, for example, graphics in the editor that describe the origins of different patches, the ability to modify the origins of sections of code, and load and/or save functions that would read and write the data from and to the origins. These functions will be described in detail below.

In an exemplary embodiment of the user editor 250 functioning in conjunction with the patch-aware editor 255, a split screen may be provided. One half of the split screen may show the source code including any patches and/or modifications made, line by line. The other half of the split screen may show a status of the code. This status may be shown for each line of the code. Different statuses that may be designated are, for example, whether the line of code is pristine, patched, or modified. It should be noted that additional statuses may also be used, such as original pristine, amended pristine, etc. In another exemplary embodiment according to the split screen, the other half may show the status of the code wherever a change has been made. The change may be, for example, a portion of source code where a patch has been applied or if a user has modified a section of code. The status may show, for example, how the code was altered, a time stamp of when the code was altered, a specific user that made the modification if multiple users have access, etc. In addition, the display may provide a correlation between the location of the code in the user modified source (e.g., user modified source 305) and the original source code (e.g., pristine source 105 or patched source 205).

In another exemplary embodiment of the user editor 250 functioning in conjunction with the patch-aware editor 255, a single display may be provided. The display may show the entire source code including any patches and/or modifications made, line by line. In this exemplary embodiment, the patch-aware editor 255 may color coordinate all the lines of code to display each line of code in a specific color depending on the status of that line of code. For example, the original pristine code may be displayed in black, patched code may be displayed in blue, modified code may be displayed in green, etc. As discussed above, when compiling modified and/or patched code, the edits may not cleanly apply. The patch-aware editor 255 may provide functionality that locates where a problem exists for clean incorporation. These sections may be displayed, for example, in red. In this exemplary embodiment, in addition to the color coordination scheme, the patch-aware editor 255 may provide footnotes and/or endnotes or some other indication to display the status of the lines of source code. For example, with endnotes, a user may know other information concerning the edit (since the color will show the type of edit) such as a time stamp, specific user, etc. In another example, a user may hover a user interface icon over a line of code and a bubble or other pop-up may display the status of the edit (e.g., type, time stamp, user, etc.).

In yet another exemplary embodiment of the user editor 250 functioning in conjunction with the patch-aware editor 255, separate files may be provided. The separate files may include, for example, one file including all pristine source code 105, another file including all patched code 205, and a third file including user-modified source code 305. In this exemplary embodiment, the open source project may store a separate file that is loaded that includes all the patched and/or modified code. The patch-aware editor 255 may allow the user to specifically display a single file that includes all the specific types of code. In this exemplary embodiment, the pristine code 105 file may display all the original pristine source code but may also include sections of code that may be crossed out, underlined, etc. to indicate if that section of code has been edited. The exemplary files may also include page numbers and line numbers. This way, the other files (e.g., patched code 205 file, user-modified code 305 file) may display the types of edits and also display where in the pristine source code 105 the edits would be incorporated. Similar to the above discussed exemplary embodiments, the status of the edit (e.g., type, time stamp, specific user) may also be provided.

The patch-aware editor 255 may provide functionality to create new paragraphs, break apart existing paragraphs, make changes to a paragraph's content, and/or delete paragraphs. As discussed above, in conventional user editors 250, a single origin file exists that includes all the pristine source files 105 or patched source files 205. The patch-aware editor 255 may provide further functionality for the user to modify the source code. For example, unlike conventional user editors 250, a user may create new paragraphs within, for example, the patched source files 205. The new paragraphs may be inserted into any location the user wishes to place them. In another example, a user may wish to separate a paragraph to incorporate a modification. If a modification and/or patch does not cleanly apply due to the complexity of a paragraph, the user may simply break it apart to allow for the modification to be incorporated. This may save time and effort that may otherwise be spent on recoding the modification and/or patch or discovering where an error would exist in, for example, the patched source files 205. In another example, if there is a clash between a modification and/or patch with the pristine source files 105, the user may simply delete the paragraph that creates the incompatibility. It should be noted that these functions may be incorporated into any of the above described exemplary embodiments.

In addition to providing the functions described above, the patch aware editor 255 will also record or keep track of the changes/additions/deletions so that the correct user code may be related back to either the pristine source or the patched source. For example, the open source project may include a new source code in the project. The user may desire to add the new source code to the user's file. However, because the user's file 305 is different from both the patched source 205 and the pristine source 105, the user may have no idea where the new source code should be inserted. Since the patch aware editor 255 keeps track of the differences between the user's file 305 and the pristine source 105, the user will be able to insert or load the new source code at the appropriate location within the user file.

Other functions of the patch-aware editor 255, as mentioned above, includes the ability to modify the origins of sections of code and load/save functions that would read and write the data from and to the origins. For example, the origins of sections of code are usually reserved for a developer to modify. The patch-aware editor 255 may include functionality that permits a user to modify the origins of sections of code. However, it should be noted that this functionality is intended for advanced users and a prompt may be necessary when modifications to origins are made to ensure that the open source project does not become useless with a careless modification. In another example, the load/save functions may allow different versions of the source code. A user may choose to read and write data from and to origins, patched sources, user-modified sources, etc. The patch-aware editor 255 would include this type of functionality as well. It should be noted that these functions may be incorporated into any of the above described exemplary embodiments of the patch-aware editor 255.

In step 415, the user editor 250 and patch-aware editor 255 updates the source file that was edited in step 410. As discussed above, the patch-aware editor 255 preserves the integrity of the origin files when the source is saved in step 420 using any of the above described exemplary embodiments.

The following will provide exemplary uses for the patch aware editor 255 according to the present invention. The first two exemplary embodiments assumes that the user has a different source tree than the community. That is, for example, the user receives the pristine source 105 along with a control file (e.g., patches.list) from the community (e.g., developer). The user may then create the patched source 205. Furthermore, the user may make changes and create the user modified source 305. This effectively creates a different source tree compared to the source tree used by the community.

In the first exemplary embodiment, the user desires to give the community a patch that the user developed. Currently, the patch is incorporated in the user modified source 305 as a user modification. However, as discussed above, the source tree of the user and the source tree of the community are different. Thus, the patch that the user created may not properly correspond to the source tree used by the community. For example, the specific location the patch should be placed may correspond to a different line in the code on the community source tree. To find the proper location within the community source tree may be very tedious and time consuming. The patch aware editor 255 may contain the functionality, as described above, to provide the user with, for example, a comparison of the user's source tree with the most recent version of the community source tree (e.g., an origin file). This may be accomplished using any of the methods described above (e.g., split screen, graphics, etc.).

In the second exemplary embodiment, the user desires to apply new patches that is forwarded in a control file (e.g., patches.list). However, as discussed above, the user currently has a user modified source 305 and the new patches may not apply to the user modified source 305 cleanly. That is, the new patches are created based on the community source tree. Thus, for example, the specific location a new patch is to be applied may not correspond to the same line in the code on the user modified source 305. To find the proper location within the user modified source 305 may also be very tedious and time consuming. The patch aware editor 255 may also contain a reverse functionality as described in the first exemplary embodiment. That is, the user modified source 305 is compared to the most recent version of the community source tree (e.g., origin file). Upon determining the proper location in the community source that the patch applies, the corresponding location in the user modified source 305 may be ascertained. Furthermore, the patch aware editor 255 may graphically represent to the user the location in the user modified source 305 the patch applies.

In a third exemplary embodiment, the user may receive a new or updated version or release of the pristine source 105 from the distributor. The user desires to install this new or updated version of the pristine source 105, but does not want to lose the functionality that the user has made, thereby creating the user modified source 305. For example, modifications 310 and 315 creating user modified source 305. The user will have a difficult time re-applying the modifications to the new version of the pristine source 105 because the user must find all the correct locations within the code of the new version of the pristine source 105 that correspond to the locations of the modifications in the user modified source 305. However, because the user implemented the patch aware editor 255, the user will be able to determine, for example, the origins of the modifications 310 and 315 in the user modified source 305. This may allow the user to capture all the user modifications present in the user modified source 305. As described above, those origins may be displayed in a graphical manner (e.g., color coded, revision bars, split-screen text description, etc.). The patch aware editor 255 also will relate the user modification. Furthermore, the patch aware editor 255 may be backwards compatible. That is, if the user wishes to revert back to an older version of the pristine source 105, the modification application described above may occur in the reverse direction.

The patch aware editor may also provide quality metrics. The patch aware editor can track information about the patch paragraphs such as offsets and fuzz factors. High values of offsets or fuzz factors may indicate areas of the patched source 205 that may be potential problem areas, even if the paragraphs apply cleanly. These areas in the modified source can be brought to the attention of the user by way of general and specific patch metrics for further analysis.

Areas of the patched source that have multiple overlapping changes from patches may be fragile and error prone, even if the patched source has cleanly applied patches and appears to perform correctly. The patch aware editor will maintain the location of all patch paragraphs. Thus, it can bring to the attention of the user any potential problem areas, allowing the user to make any necessary corrections or take precautions that may result in a modified source with a higher quality.

The patch aware editor may also tune its patch resolution and management features to direct and promote a company's best practices, helping to produce consistent results, and also to guide newer developers in this complex task. In its full implementation, this centralized tool may implement an expert system for patching, in a way that the current distinct and disjointed tools and practices cannot.

In some cases, a patch that does not apply may be modified and/or split up until it does apply to the pristine or modified source. However, in some cases, a developer may not want to change this patch file. For example, when tracking a patch file that is maintained in the open source community and the name is not enumerated by version and it is not desired to re-process this patch file every time there is an update.

In such a case, the exemplary embodiments of the patch aware editor may be used to (a) help the user create a pre-patch file for the source so that the new 'pristine' patch file will apply, (b) apply the new patch file, and (c) help the user create a post-patch file for the source to restore the changes that were required of the pre-patch file. When the external "pristine" patch file is updated, the "pre-patch" will still work though there may be changes required for the post-patch, depending on what was changed in the new "pristine" patch file.

Those skilled in the art will understand that the above described exemplary embodiments may be implemented in any number of manners, including, as a separate software module, as a combination of hardware and software, etc. For example, the patch aware editor 255 may be a program containing lines of code that, when compiled, may be executed on a processor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A non-transitory computer-readable storage medium storing a set of instructions executable by a processor, the set of instructions being operable to:

receive an origin file corresponding to source code, wherein the origin file is a sequential list of lines of the source code;

modify the source code to create a modified source code;

create a modified file corresponding to the modified source code;

compare the modified file to the origin file;

save the modified source code and modified file without altering the origin file; and display conflicts between the modified file and the origin file.

2. The non-transitory computer-readable storage medium of claim 1, wherein the origin file includes a paragraph data structure.

3. The non-transitory computer-readable storage medium of claim 2, wherein the creating the modified file includes one of creating a new paragraph data structure, breaking apart the paragraph data structure, making changes to a content of the paragraph data structure and deleting a content of the paragraph data structure.

4. The non-transitory computer-readable storage medium of claim 1, wherein the set of instructions is further operable to:

create the origin file.

5. The non-transitory computer-readable storage medium of claim 1, wherein the set of instructions is further operable to:

display the modified source code and the corresponding modified file, wherein displaying of the corresponding modified file includes an origin of a section of the modified source code.

6. The non-transitory computer-readable storage medium of claim 1, wherein the source code is open source.

7. A system, comprising:

an editor for editing source code to create a modified source code; and a patch aware editor storing an origin file corresponding to the source code and creating a modified file corresponding to the modified source code, the patch aware editor comparing the origin file to the modified file and displaying conflicts between the files, wherein the origin file is a sequential list of lines of the source code, and wherein the patch aware editor saves the modified source code and modified file without altering the origin file.

8. The system of claim 7, further comprising:

a display for displaying conflicts between the modified file and the origin file.

9. The system of claim 7, wherein the origin file includes a paragraph data structure.

10. The system of claim 9, wherein the creating the modified file includes one of creating a new paragraph data structure, breaking apart the paragraph data structure, making changes to a content of the paragraph data structure and deleting a content of the paragraph data structure.

11. The system of claim 7, wherein the patch aware editor creates the origin file.

12. The system of claim 7, further comprising:

a display for displaying the modified source code and the corresponding modified file, wherein displaying of the corresponding modified file includes an origin of a section of the modified source code.

13. The system of claim 7, wherein the source code is open source.

* * * * *